March 3, 1970  G. R. SMITH  3,498,561
PIVOTED FISHING REEL WITH BRAKE
Filed Feb. 14, 1967

Gorman R. Smith
INVENTOR

BY

Agent

United States Patent Office 3,498,561
Patented Mar. 3, 1970

3,498,561
PIVOTED FISHING REEL WITH BRAKE
Gorman R. Smith, 5931 NE. 10th Ave.,
Portland, Oreg. 97211
Continuation-in-part of application Ser. No. 455,657,
May 13, 1965. This application Feb. 14, 1967, Ser.
No. 615,985
Int. Cl. A01k 89/02
U.S. Cl. 242—84.2
6 Claims

ABSTRACT OF THE DISCLOSURE

The hollow hub of a fishing line spool is mounted rotatably on a hollow bearing supported on a bracket. A brake disc is secured to a non-rotatable shaft movable longitudinally through the bearing by a finger lever on the bracket for adjustably interengaging the spool hub and brake disc to provide desired spool drag. A turret base member, adapted for attachment to a fishing pole, mounts the bracket rotatably for adjusting the spool between casting position and right or left hand reeling operation.

Cross-reference to related application

This application is a continuation-in-part of my earlier application, Ser. No. 455,657, filed May 13, 1965 for Fishing Reel and now abandoned.

Background of the invention

This invention relates to fishing reels, and more particularly to a simplified fishing reel of the heavy duty casting type.

Casting reels provided heretofore are of rather complex and costly construction. They require delicate and time consuming assembly and disassembly for cleaning and lubrication of relatively moving parts and, in the absence of such maintenance, frequent and costly replacement of parts. Such reels also are difficult and inconvenient to make running adjustment of proper spool drag during playing and landing of a fish, with consequent frequent loss of the fish. Further, the turret mountings of such reels generally are susceptible to jamming by debris, or are otherwise difficult to adjust between casting and reeling positions.

Summary of the invention

The present invention achieves the principal objective of overcoming the foregoing disadvantages by the provision of a casting reel of simplified construction in which the number of parts are reduced to a minimum, the moving parts of which require no lubrication, are all exposed for ready cleaning and therefore are free from jamming, and are assembled, disassembled and adjusted with speed and facility.

The foregoing and other objectives and advantages of the present invention will appear from the following detailed description, taken in connection with the accompanying drawing of the preferred embodiment.

Description of the preferred embodiment

Figure 2:
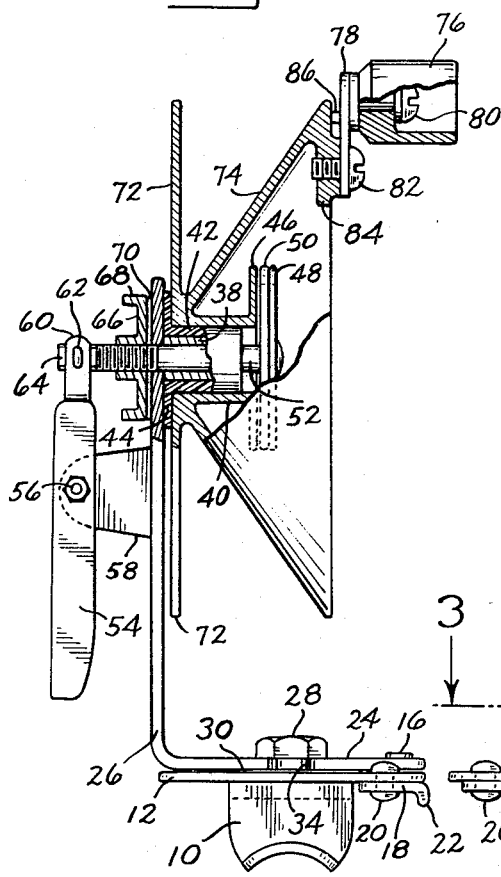
FIG. 2 is an end elevation viewed from the left in FIG. 1, parts being broken away to disclose details of internal construction.
Figure 1:
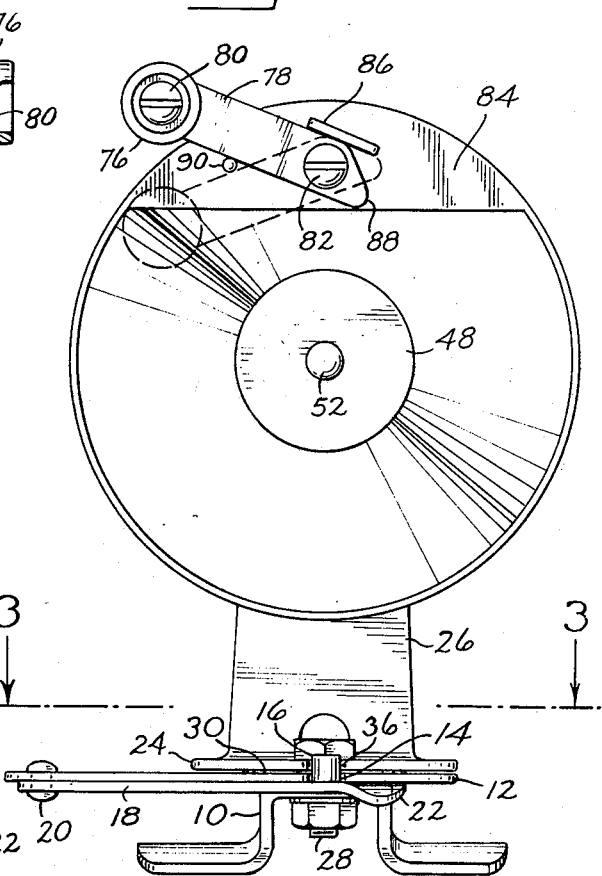
FIG. 1 is a side elevation of a casting reel embodying the features of the present invention.

Referring to FIGS. 1 and 2 of the drawing, a saddle member 10, adapted for removable attachment to a fishing pole provided with the usual sliding rings (not shown), has a central offset portion which is welded or otherwise secured to a turret base member 12. A peripheral notch 14 in the base member removably receives a locking pin 16 mounted adjacent one end of a locking lever 18, the opposite end of which is pivotally secured to a base member by such means as the rivet 20. The end of the lever adjacent the locking pins is offset away from the base member to provide a finger tab 22 by which to manipulate the lever.

A spool support bracket member has an offset inner turntable section 24 and an outer spool support section 26. The turntable section is secured rotatably to the turret base member by means of the pivot bolt 28. An antifriction washer 30, preferably made of Teflon for its low coefficient of friction, is interposed removably between the base member and turntable section 24, about the pivot bolt, to facilitate relative rotation of the parts. Peripheral notches 32, 34 and 36 in the turntable section 24 are spaced apart circumferentially at 90° intervals, for purposes explained more fully hereinafter. Each of these notches is arranged, upon rotation of the bracket member about the pivot bolt 28, to register with the notch 14 in the turret base member and, when so registered, to removably receive the locking pin 16 to secure the parts against relative rotation.

Adjacent the upper end of the spool support section 26 of the bracket member there is secured, as by welding, an elongated hollow bearing member 38. The axial bore in the bearing member registers with an opening in the support section 26, and this axial bore is disposed substantially normal to the pivot axis of the bolt 28. Mounted removably on this bearing for rotation relative thereto is the hollow hub 40 of a fishing line spool. There is interposed between the spool hub and bearing member an anti-friction sleeve 42, preferably made of Teflon. In the embodiment illustrated this sleeve is provided with an outwardly projecting flange 44 at one end adapted to be interposed between the adjacent surfaces of the spool and support section 26. The flanged sleeve thus minimizes resistance to rotation of the spool. Like washer 30, the flanged sleeve also is removable to facilitate cleaning of the parts.

The end of the hub 40 opposite the spool support section 26 is provided with an outwardly projecting brake flange 46. Associated with this flange is a brake disc 48. The disc preferably is made of metal, and its surface facing the flange 46 supports a washer 50 of leather or other suitable material having a relatively high coefficient of friction.

The brake disc is secured to one end of an elongated shaft 52 which extends slidably through the axial bore of the bearing member 38 and the registering opening in the spool support section, for longitudinal movement relative thereto. Longitudinal movement of the shaft is effected by means of a brake control lever 54.

The lever illustrated is U-shaped in cross-section, being formed of a strip of metal bent along its longitudinal center line. The lever is supported intermediate its ends pivotally by the pivot bolt 56 which extends through registering openings in the lever and mounting tab 58 projecting from the spool support section 26. The axis of the pivot bolt is substantially normal to the axis of longitudinal movement of the shaft 52. The end of the lever adjacent the shaft 52 is provided with spaced fingers 60 which engage the shaft through the pivot pin 62. Although the pin is shown as a cotter pin extending through aligned openings in the fingers and shaft, it may merely be a straight pin projecting through the shaft outward of the fingers for abutment by the latter. In either case, upon the application of finger pressure to the end of the lever opposite the fingers and in the direction toward the support section 26, the fingers are moved outward, moving the shaft with it longitudinally to bring the brake washer 50 into frictional contact with the brake flange 46. By appropriate application of finger pressure to the lever, the desired degree of spool drag thus may be achieved.

The shaft is restrained against rotation relative to the bearing member. This may be accomplished by providing the shaft and bearing member bore with complementary non-circular cross sectional shapes. In the embodiment illustrated, this is accomplished by the connecting pin 62. If the pin is located outward of the fingers 60, the shaft is restrained against rotation by capturing the outer flattened end portion 64 of the shaft between the fingers.

A releasable spool locking brake also preferably is provided for securing the spool against rotation without use of the lever 54. In the embodiment illustrated, the portion of shaft 52 between the cotter pin 62 and bearing member 38 is threaded to receive the threaded hub of disc brake member 66. The outer periphery of this brake member preferably is provided with a knurled flange 68 for convenient gripping by the fingers. A friction washer 70 is interposed between the disc member 66 and support section 26 to enhance braking efficiency.

Although a conventionally shaped fishing line spool may be employed for the reel of the present invention, the spool best illustrated in FIG. 2 of the drawing is preferred. This spool includes a flat rear disc 72 radiating from the end of the hub 40 opposite the brake flange 46, and a conical disc 74 which diverges forwardly from the same end of the hub. The V-shaped annular groove thus formed between the discs accommodates a substantial length of high test fishing line and also affords maximum freedom of line removal from the spool during casting.

An operating handle is attached to the spool for rotating the latter. In the embodiment illustrated the handle includes a knurled knob 76 mounted rotatably on one end of a lever 78 by such means as the pivot screw 80. The opposite end of the lever is mounted pivotally, by means of screw 82, on a segment plate 84 welded to or otherwise formed integral with the conical disc 74.

Associated with the lever 78 is a stop block 86 secured to the plate 84 adjacent the pivot screw 82. When not in use the lever is retracted to the dash line position in FIG. 1 at which the knob 76 is confined within the circumferential plane of the conical disc. The limit of retraction is determined by abutment of the projection 88 on the pivoted end of the lever with the block 86. When used for rotating the spool, the lever is pivoted about the pivot screw 82 to the position at which it abuts the stop block 86 with the knob disposed adjacent the periphery of the conical disc. The position of extension affords sufficient leverage for easy rotation of the spool, and the position of retraction places the knob out of the way for casting. A projection 90 on the plate 84 assists in retaining the lever in its positions of extension and retraction, the lever being sufficiently resilient to deflect laterally to move across the projection.

Figure 4:
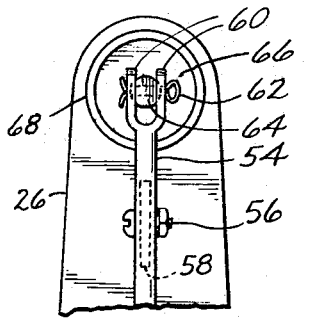
FIG. 4 is a fragmentary side elevation viewed from the left in FIG. 2 and showing the structural arrangement of mechanism for controlling the drag on the fishing line spool.
Figure 3:
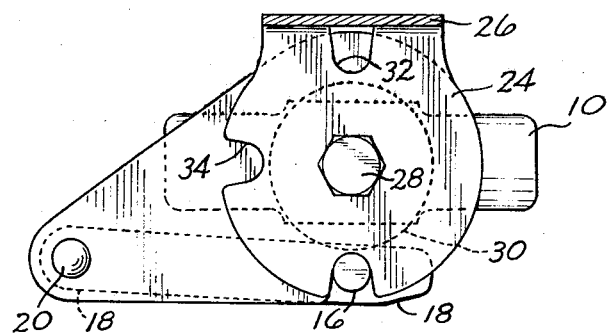
FIG. 3 is a sectional view taken on the line 3—3 in FIG. 1.

The drawing illustrates the spool in position for right hand operation for reeling in a fishing line. In FIG. 1 the tip of a fishing pole (not shown) is toward the right, while FIG. 2 represents a rear view. If it is desired to adjust the spool for left hand operation, the locking lever 18 is pivoted clockwise (FIG. 3) about the pivot rivet 20 to retract the locking pin 16 from the registering notches 14 and 36. The bracket member then is rotated counterclockwise 180° about the pivot bolt 28 to bring the notch 32 in the turntable section 24 of the bracket member into registry with the peripheral notch 14 in the turret base member 12. The locking pin then is inserted in the registering notches to lock the parts against relative movement.

To adjust the spool from the right hand reeling position illustrated in the drawing to the casting position, the locking pin 16 is withdrawn from the registering notches, the bracket member is rotated counterclockwise (FIG. 3) 90° to bring the notch 34 in the turntable section of the bracket member into registry with the notch 14 in the turret base member, and the locking pin reinserted in the registering notches. The forward end of the spool thus faces the tip of the fishing pole. The spool operating lever 78 is retracted to the position illustrated in dash lines in the drawing, and the brake 66 is set by rotating in on the threaded portion of shaft 38 to tighten the washer 70 against the support section 26 and draw the brake member 50 into engagement with flange 46.

Cleaning of the reel is accomplished with speed and facility, simply by removal of the pivot bolt 28 and cotter pin 54. No lubrication is required in the assembly. The provision of peripheral locking notches associated with the locking pin 16, together with the complete exposure thereof, minimizes the possibility of jamming and failure of the locking mechanism. The simplicity of the parts and their assembly affords economical manufacture and assures long service life with a minimum of maintenance and repair.

It will be apparent to those skilled in the art that various changes in the size, shape and arrangement of parts described hereinbefore may be made without departing from the spirit of this invention.

Having now described my invention and the manner in which it may be used, I claim:

1. A fishing line casting reel, comprising
   (a) a turret base member adapted for mounting on a fishing pole and having a locking notch in the periphery thereof,
   (b) a spool support bracket member having a spool mounting section and a turntable section, the latter being mounted rotatably on the base member and having a plurality of spaced positioning notches in the periphery thereof each registrable with the locking notch upon rotation of the bracket member relative to the base member,
   (c) locking lever means secured pivotally to the base member,
   (d) locking pin means on the lever means movable with the latter inward for reception in said locking notch and a positioning notch registering therewith and outward for disengagement from said registering notches, for securing the bracket member releasably in its position of adjustment relative to the base member,
   (e) a fishing line spool member mounted on the spool mounting section of the bracket member for rotation on an axis substantially normal to the axis of rotation of the turntable section,
   (f) a bearing member projecting from the spool mounting section of the bracket member and having an axial bore therethrough,
   (g) a hollow hub on the spool member mounted removably on the bearing member for axial rotation,
   (h) the hub having a brake flange on its end opposite the spool mounting section,
   (i) anti-friction sleeve means interposed between the bearing member and spool hub and having a flange portion interposed between the spool member and spool mounting section of the bracket member for spacing the spool member from the spool mounting section,
   (j) a brake disc support shaft extending through the bore of the bearing member for longitudinal reciprocation therein,
   (k) means operatively interengaging the support shaft and spool mounting section for securing the support shaft against rotation relative to the spool mounting section, (l) a brake disc secured to the support shaft adjacent the brake flange and movable by the shaft toward and away from the brake flange, (m) lever means engaging the spool mounting section for pivotal movement on an axis substantially normal to the axis of movement of the support shaft, and (n) means on one end of the lever means engaging the end of the support shaft opposite the brake disc for reciprocating the support shaft relative to the spool mounting section, whereby to move the brake disc toward and away from the brake flange.

2. The casting reel of claim 1 wherein the means securing the support shaft against axial rotation comprises spaced fingers on the lever means engaging a non-circular portion of the support shaft.

3. The casting reel of claim 1 wherein the means securing the support shaft against axial rotation comprises pin means pivotally interconnecting the shaft and lever means.

4. The casting reel of claim 1 including a locking disc brake member engaging a threaded portion of the support shaft between the spool mounting section and lever means and movable to releasably engage the spool mounting section.

5. A fishing line casting reel, comprising (a) a spool mounting bracket member adapted for mounting on a fishing pole, (b) a bearing member projecting from the spool mounting bracket member and having an axial bore therethrough, (c) a spool member having a hollow hub mounted removably on the bearing member for axial rotation, (d) the hub having a brake flange on its end opposite the spool mounting bracket member, (e) anti-friction sleeve means interposed between the bearing member and spool hub and having a flange portion interposed between the spool member and spool mounting bracket member for spacing the spool member from the spool mounting bracket member, (f) a brake disc support shaft extending through the bore of the bearing member for longitudinal reciprocation therein, (g) means operatively interengaging the support shaft and spool mounting bracket member for securing the support shaft against rotation relative to the spool mounting bracket member, (h) a brake disc secured to the support shaft adjacent the brake flange and movable by the shaft toward and away from the brake flange, (i) operator means operatively interengaging the support shaft and spool mounting bracket member for reciprocating the support shaft relative to the spool mounting bracket member, whereby to move the brake disc toward and away from the brake flange, (j) the operator means comprising a lever interengaging the spool mounting bracket member and support shaft, and the means securing the support shaft against axial rotation comprising pin means pivotally interconnecting the shaft and lever.

6. A fishing line casting reel comprising (a) a spool mounting bracket member adapted for mounting on a fishing pole, (b) a bearing member projecting from the spool mounting bracket member and having an axial bore therethrough, (c) a spool member having a hollow hub mounted removably on the bearing member for axial rotation, (d) the hub having a brake flange on its end opposite the spool mounting bracket member, (e) anti-friction sleeve means interposed between the bearing member and spool hub and having a flange portion interposed between the spool member and spool mounting bracket member for spacing the spool member from the spool mounting bracket member.

(f) a brake disc support shaft extending through the bore of the bearing member for longitudinal reciprocation therein, (g) means operatively interengaging the support shaft and spool mounting bracket member for securing the support shaft against rotation relative to the spool mounting bracket member, (h) a brake disc secured to the support shaft adjacent the brake flange and movable by the shaft toward and away from the brake flange, (i) operator means operatively interengaging the support shaft and spool mounting bracket member for reciprocating the support shaft relative to the spool mounting bracket member, whereby to move the brake disc toward and away from the brake flange, (j) and a locking disc brake member engaging a threaded portion of the support shaft for releasable engagement with the spool mounting bracket member.

References Cited

UNITED STATES PATENTS

| 2,129,903 | 9/1938 | Benson | 242—84.53 |
| 2,656,993 | 10/1953 | Dukes | 242—84.53 |
| 3,226,052 | 12/1965 | King | 242—84.2 XR |
| 3,241,788 | 3/1966 | Visockis | 242—84.51 |
| 3,315,912 | 4/1967 | Balaguer | 242—84.2 |

FOREIGN PATENTS

| 6,779 | 1910 | Great Britain. |
| 786,659 | 11/1957 | Great Britain. |

BILLY S. TAYLOR, Primary Examiner

U.S. Cl. X.R.

242—84.1, 84.53